May 1, 1928. 1,668,090
L. SPENCER
ART OF WELDING
Filed April 6, 1926 2 Sheets-Sheet 1

INVENTOR
*Lorillard Spencer.*
BY
*Dohleberd Ledbetter*
ATTORNEYS

May 1, 1928.

L. SPENCER

ART OF WELDING

Filed April 6, 1926

INVENTOR
*Lorillard Spencer.*
BY
ATTORNEYS

Patented May 1, 1928.

1,668,090

UNITED STATES PATENT OFFICE.

LORILLARD SPENCER, OF NEW YORK, N. Y.

ART OF WELDING.

Application filed April 6, 1926. Serial No. 100,035.

This invention relates to a method and apparatus for use in welding and particularly for use in welding more or less thin structural members such for example as steel tubing. It is well known in the art that structures such as bicycle frames and the like requiring a high ratio of strength to weight may well be made of pieces of relatively thin steel tubing welded together to form a single integral frame member.

In the past, however, failures have resulted in such structures which were found to have been caused by improper welding. It is easy for an inexperienced welder to apply too much heat to the joint when making a weld, which may modify the physical or chemical nature of the metal, or both, in or near the weld, and cause a decrease in the strength of the member so that failure may result under what would be considered a safe load.

On the other hand, if not enough heat be applied to the weld, this may result in the formation of what may appear to be a proper joint, but in reality is not, and such a joint is likely to fail under normal load. It is to be noted that in this case the failure is in the joint itself whereas in the case of failure resulting from excess of heat during the welding, the failure may take place at a distance from the joint depending upon the changes which have taken place in the metal structure.

My invention contemplates a method and apparatus which will not only indicate to the welder when the proper amount of heat is being used in making a weld, but which will also form a permanent record of whether or not the proper amount of heat was used. In other words, my invention contemplates that the welded structure shall carry upon itself at or near the joint, permanent evidence showing unmistakably whether or not the weld was properly made, so that anyone, even one unskilled in the art of welding, may tell at a glance whether the welded member has been properly made.

Such a method and apparatus has considerable value since it permits the employment of relatively unskilled labor for welding operations by providing a simple and reliable indicator whose showing may be followed by the workman to produce a satisfactory job. At the same time it affords a ready means of detection of improper workmanship whether the same be turned out by the workman through indifference, negligence, or for any other reason. Further, it permits the employment of unskilled labor as inspectors of the finished frames or joints since it is only necessary for the inspector to note the condition of the indicator.

According to my invention I employ a fusible metal band or block which I attach to the member to be welded at a predetermined distance from the point where the joint is to be made. The composition of the fusible metal will be selected so that its melting point is at or just below the point at which the structure of the metal is affected or at which injury occurs. In such case, if the fusible metal band or block melts during the weld, it indicates that too much heat has been used and the member is no longer safe for its normal load. I may also employ a second fusible band or block attached in a similar way to the member to be welded but the composition of this second band or block is so chosen that its melting point lies at or just above the minimum temperature required to make a proper weld.

Again, I may combine the two blocks or bands, as it were, and use a composite band or block of metal having a melting point chosen as described above and having inserts or parts attached thereto of a metal having another melting point. For example, I may use a band or block having one part made of metal having a melting point just at or below the point at which the structure of the metal to be welded is affected, and having another part made of metal having a melting point just at or above the melting point required to make a satisfactory weld.

It is an object of this invention to provide an indicator which will show positively both during and after the welding operation whether too much or too little heat is being or has been applied whereby relatively unskilled labor may be employed not only as welders but as inspectors of the completed work.

It is a further object of this invention to provide an indicator for the purpose described which shall be relatively inexpensive, reliable and sturdy.

It is a further object of this invention to provide an indicator of the class described which shall be readily understood by the public and which will have distinctive characteristics which the public may be taught to recognize and interpret. Still other objects will be apparent from the specification.

My invention will best be understood both as to its underlying principles and as to its particular embodiments by reference to the specification and to the accompanying drawing in which Figure 1 illustrates a jump weld with a simple form of fusible metal band indicator in position according to my invention;

Figure 1:
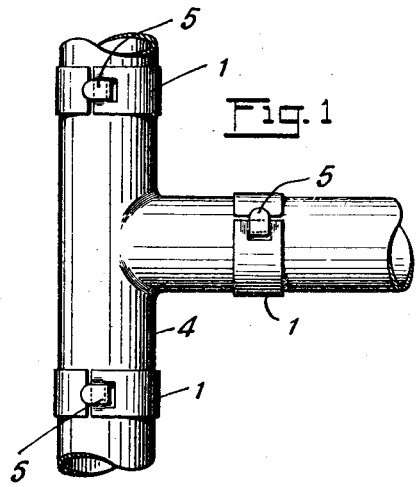
Figure 2:
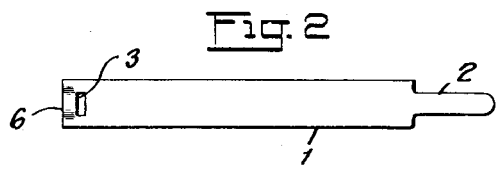
Figure 2 is a plan view of one of the fusible metal bands shown in Figure 1.
Figure 3:
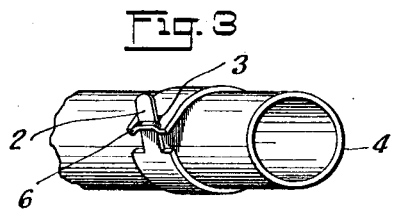
Figure 3 illustrates the way of applying the band shown in Figures 1 and 2.

As illustrated in Figures 1, 2, 3, 4 and 6, the fusible bands may for example have a tongue 2 located at one end and a slot 3 punched near the extremity of the other end, said tongue and slot forming means for fastening the band in place on the tubing 4 as illustrated in Figures 1 and 3. The band 1 is first bent around the tubing allowing the tongue 2 to pass through the slot 3, and the tongue is then bent back upon itself to form a hook 5. To allow the slotted end of the band to come into contact with the tubing, I have provided a raised portion 6 between the slot and the end of the band which is equal to the thickness and width of the tongue 2 (see Figure 3).

The band 1 consists of a fusible metal that will melt at a predetermined temperature. If the melting point of the band 1 is that at which the structure of the metal is affected, the melting of the band when the weld is being made indicates that too much heat is being applied, whereas, if the proper heat is used, the bands will adhere to the tubing since the inner surface of the bands will become slightly softened from the applied heat. On the other hand, if the melting point of the band is chosen to indicate minimum heat necessary for a good weld, the band will be destroyed by being melted during the welding operation. It will be clear that a high melting point band may be used in conjunction with a low melting point band if desired, but this is not as satisfactory as other forms of my invention for the reason that the lower melting point band will be destroyed when a proper weld is made and therefore will leave no indication on the joint.

Figure 4:
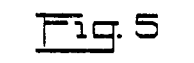
Figure 4 is a plan view of a modified form of band having circular inserts of a lower fusible metal than the band itself.

The form of band described above when used singly will give an indication with reference to only one temperature. In order to provide a single band which will indicate when an insufficient amount of heat has been applied, as well as when too much is used, I may use the modified form of band as illustrated in Figure 4 with body portion 6 and inserts 7 which are made of a metal of different melting point than the body 6. The portion 6 may conveniently be of higher melting point and inserts 7 of the lower melting point, but clearly the portions may be reversed. When the weld has been made the higher melting portion of the band will remain upon the tubing as already described, while the lower melting portion will be destroyed by being melted.

Figure 6:
Figure 6 is a bottom view of another modified form of band having a strip of lower fusible metal held in position by the turned over edge of the band.
Figure 5:
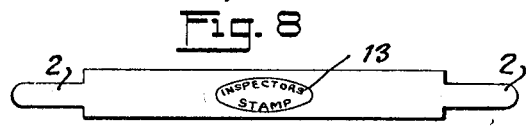
Figure 5 is a section taken on the line 5—5 of Figure 6.
Figure 5:
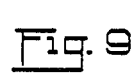
Figure 7:
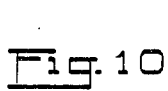
Figure 7 is a section taken on the line 7—7 of Figure 6.

The modified form illustrated in Figure 6 is a low and high heat indicator also, but is given a form which may under certain conditions be more easily and cheaply produced in quantities than that shown in Figures 4 and 5. It consists of a strip of one melting point metal as 9 held to a strip of different melting point metal 10 by suitable means, such as turned edges 12. Holes 11 may be punched in portion 10 before assembling it to portion 9. If 10 is the higher melting metal and 9 the lower, the portions 9 will be destroyed when a proper weld is made and the other portion 10 will adhere to the tubing as above described.

Figure 8:
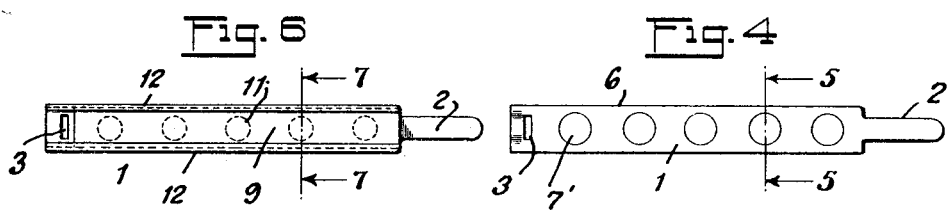
Figure 8 is a plan view of another modified form of band having tongues at both ends and provided with an appropriate legend.
Figure 9:
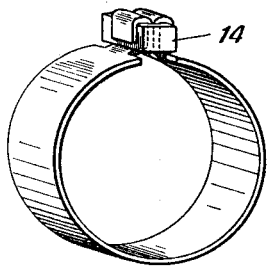
Figure 9 illustrates one method of fastening the modified band shown in Figure 8 when bent around the tubing.
Figure 10:
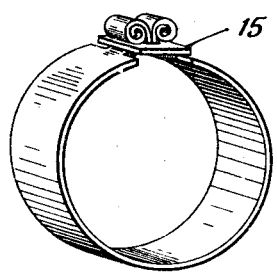
Figure 10 illustrates another method of fastening the modified band.

The modified bands illustrated in Figures 4 and 5 may be applied to the member to be welded as already described, being provided with tongues 2 and slots 3 for the purpose, or other fastening means may be used. For example, Fig. 8 shows a modified form of fastening means for the bands according to my invention. A tongue 2 may be formed on both ends of the band and as shown the bands may be stamped as at 13 with a metal die for inspection or identification purposes. This modified form of band may be held tightly around the tubing by means of a rectangular block 14 having a slot in its center through which the tongues 2 are passed, said tongues then being bent outward and over the sides to complete the binding action as illustrated in Figure 9, or it may be fastened by passing the tongues through a slot in the center of a thin metal plate 15 and then rolling them outward upon themselves as illustrated in Figure 10. This roll may be given the tongues by means of round nose pliers or any other suitable means.

Figure 11:
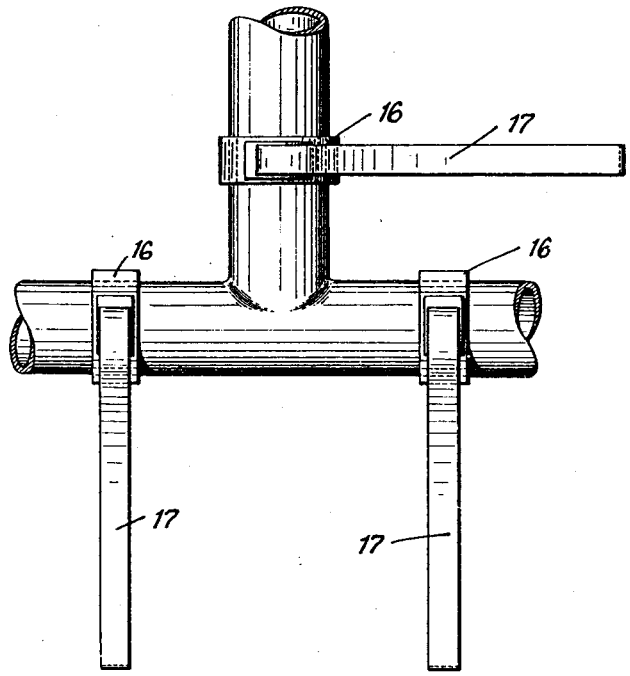
Figure 11 illustrates a jump weld with a modified form of heat indicator which is held in position by means of spring clamps.
Figure 12:
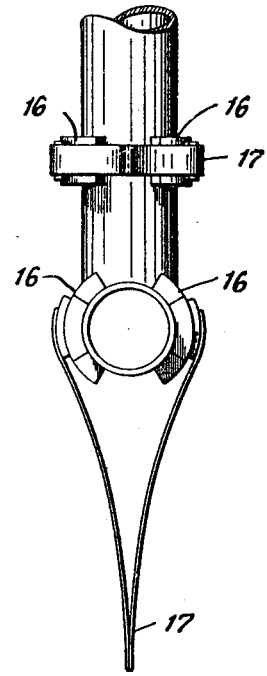
Figure 12 is an end view of same.
Figure 13:
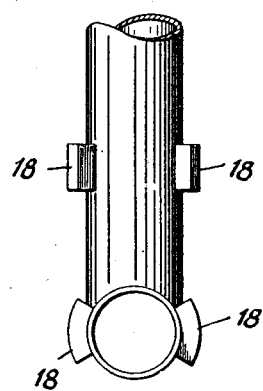
Figure 13 is an end view of same after the weld has been completed.
Figure 14:
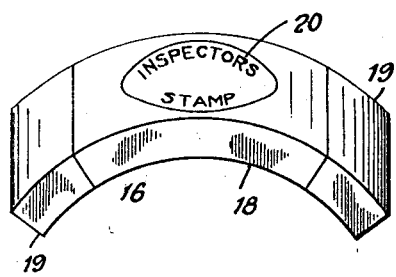
Figure 14 illustrates the modified form of heat indicator shown in Figures 11, 12 and 13.

Referring to Figure 11, the heat indicator shown in this figure consists of a segmental or arcuate block instead of a band. Two blocks may be used together on opposite sides of the tubing and held in position by spring clamps 17. The blocks may for example be made up of three sections, a center section 18 and two outer sections 19 as most clearly illustrated in Figure 14. The central section 18 may conveniently consist of the higher fusible metal and the two end sections 19 of the lower fusible metal, and suitable markings may be provided on the higher melting metal as at 20. During the process of welding the lower fusible metal will melt away and the higher fusible central sections will fuse to the tubing and remain in position when the clamps are removed, as illustrated in Figure 13.

The proper distance from the joint at which to apply the various forms of indicators according to my invention is best found by experience with the particular type of members to be welded, the form of indicator used and the constitution of the indicating metal. It is to be noted that the use of indicators according to my invention lends itself readily to a rigid inspection system and a checking up of defective workmanship. For instance, the supply of indicators may be controlled by one man, who may be chief inspector, who places up the indicators in the proper position on the joint to be made. When the workman turns in the welded joint with the indicators in a satisfactory condition, he may be given credit for the job, but if the indicators are not in satisfactory condition, the workman may be charged for work spoiled.

While I have shown and described certain forms of my invention, it will be clear that modifications and changes may be made without departing from the spirit and scope thereof, as will be understood by those skilled in the art.

Having described my invention in such manner that those skilled in the art may practice the same and obtain the benefits thereof, I declare that what I claim is:

1. The improvement in the art of welding which comprises applying to the member to be welded an indicator of such nature that will be destroyed by heat sufficient to injure the member to be welded, and applying heat to the joint to be made only in such quantities that the indicator is not destroyed.

2. The improvement in the art of welding which comprises applying to the member to be welded an indicator of fusible metal which will be destroyed by heat sufficient to injure the member to be welded, and applying heat to the joint to be made only in such quantities that the indicator is not destroyed.

3. The improvement in the art of welding which comprises applying to the member to be welded a fusible metal indicator which will be caused to adhere permanently to the member to be welded on the application of the heat necessary to make a proper weld, and which will be destroyed by the application of heat sufficient to injure the member to be welded, and applying to the joint to be made heat less than that sufficient to cause destruction of the indicator.

4. The improvement in the art of welding which consists in applying to the member to be welded an indicator having a portion of such nature that it will be destroyed by the application to the joint of the minimum heat necessary to make a proper weld and having another portion of such nature that it will be destroyed by the application to the joint of heat sufficient to injure the member to be welded, and applying to the joint heat sufficient to destroy the first portion of such indicator but sufficient to destroy the second portion thereof.

5. The improvement in the art of welding which consists in applying to the member to be welded an indicator of fusible metal having a portion so constituted that it will be destroyed by the application to the joint of the minimum heat necessary to make a proper weld, and having another portion so constituted that it will be destroyed by the application to the joint of heat sufficient to injure the member to be welded, and applying to the joint heat sufficient to destroy the first portion of such indicator and insufficient to destroy the second portion thereof.

6. An indicator for welding, comprising a member adapted to be secured in position on the member to be welded and so constituted that it will be destroyed by the application during the welding operation of heat sufficient to cause injury to the member to be welded.

7. An indicator for welding, comprising a member adapted to be secured in position on the member to be welded and so constituted that it will be destroyed by the application during the welding operation of heat sufficient to cause injury to the member to be welded, and will be caused to adhere permanently to the member if the proper heat is used.

8. An indicator for welding, comprising a member adapted to be secured in position on the member to be welded, and having a portion so constituted that it will be destroyed by the application during the welding operation of heat sufficient to make a proper joint, and having another portion so constituted that it will be destroyed by the application during the welding operation of heat sufficient to cause injury to the member to be welded.

9. An indicator for welding, comprising a member adapted to be secured in position on the member to be welded, and having a portion so constituted that it will be destroyed by the application during the welding operation of heat sufficient to make a proper joint, and having another portion so constituted that it will be destroyed by the application of heat sufficient during the welding operation to cause injury to the member to be welded, and said second portion being so constituted that it will adhere permanently to the member to be welded if the proper heat is used.

10. An indicator for welding, comprising a member adapted to be secured in position on the member to be welded and having a portion of fusible metal so constituted that it will be destroyed by the application during the welding operation of heat sufficient to make a proper joint and having another portion of fusible metal so constituted that it will be destroyed by the application during the welding operation of heat sufficient to cause injury to the member to be welded, said second portion being so constituted that it will adhere to the member to be welded if the proper heat is used.

11. An indicator for welding, comprising a fusible metal band adapted to be secured about the member to be welded.

12. An indicator for welding, comprising a composite fusible metal member having two portions having different melting points, adapted to be secured to the member to be welded.

13. A welding indicator, comprising a fusible metal indicator adapted to be secured to the member to be welded and means for retaining said indicator in position.

14. A welding indicator adapted to be secured to the member to be welded, and so constituted that it will be destroyed by the application during the welding operation of heat sufficient to injure the member to be welded and being so constituted that it will adhere to the member to be welded if the proper heat is used, and provided with a suitable legend for indicating that a proper weld has been made.

In testimony whereof, I have hereunto set my hand this 31st day of March, 1926.

LORILLARD SPENCER.